Aug. 14, 1951  B. WILLIAMSON ET AL  2,564,290
PHONOGRAPH TURNTABLE DRIVE
Filed May 23, 1947  3 Sheets-Sheet 1

*Inventor*
Ben Hunsaker
Bert Williamson

By *Clarence A. O'Brien
and Harvey B. Jacobson*
*Attorneys*

Aug. 14, 1951  B. WILLIAMSON ET AL  2,564,290
PHONOGRAPH TURNTABLE DRIVE

Filed May 23, 1947  3 Sheets-Sheet 2

Inventor

Ben Hunsaker
Bert Williamson

By *Clarence A. O'Brien and Harvey B. Jacobson*
Attorneys

Aug. 14, 1951 B. WILLIAMSON ET AL 2,564,290
PHONOGRAPH TURNTABLE DRIVE
Filed May 23, 1947 3 Sheets-Sheet 3
Fig. 4.
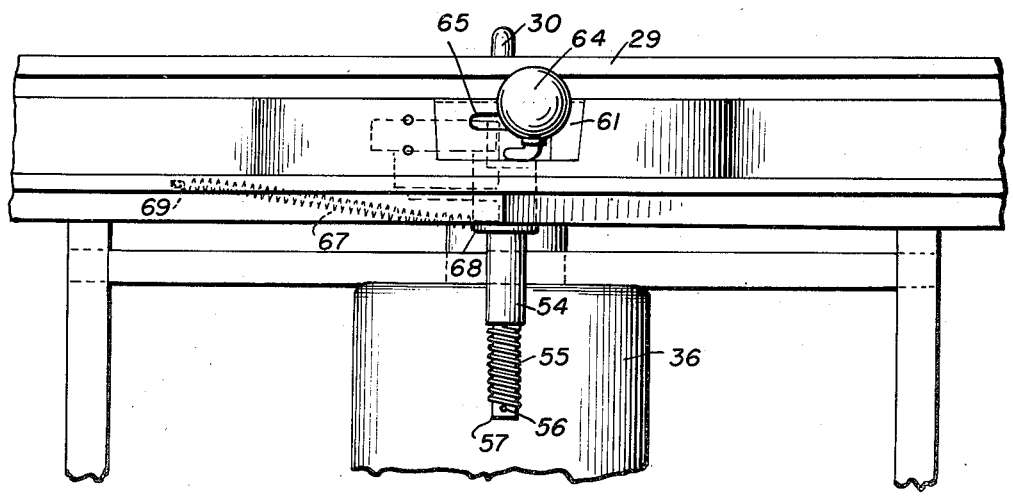
Fig. 5.
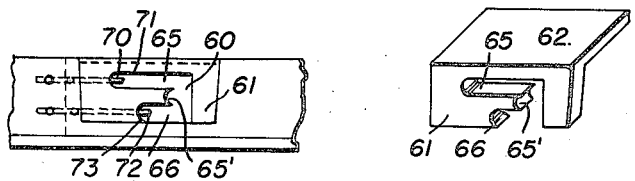
Fig. 6.
Inventor
Ben Hunsaker
Bert Williamson
By *Clarence A. O'Brien and Harvey B. Jacobson*
Attorney Patented Aug. 14, 1951

2,564,290

UNITED STATES PATENT OFFICE 2,564,290

PHONOGRAPH TURNTABLE DRIVE

Bert Williamson and Ben Hunsaker, Visalia, Calif.; said Hunsaker assignor to said Williamson Application May 23, 1947, Serial No. 750,150

3 Claims. (Cl. 74—190)

This invention relates to phonographs and has for its object to provide a turntable speed changing mechanism.

Another object of the invention is to provide in a speed changing mechanism means whereby the necessity of locking a speed changing lever in a desired position is eliminated.

A further object of the invention is to provide in a phonograph means whereby adjustments of driving power, may be quickly and accurately made without removing the turntable of the phonograph whereby much time is saved in accurate adjustment of the driving and shifting mechanism.

Another object of the invention is to provide a phonograph in which the turntable and its supporting mechanism and the driving mechanism are separate and independent units.

Another object of this invention is to provide a pulley driven turntable in which the speed of the table is independent of the puck diameter, thereby wear and consequent reduction of pulley diameter will not effect turntable speed.

Other features and advantages will become more readily apparent from the following description and the accompanying illustrative drawings, in which:

Figure 4 is a broken away side elevational view of the preferred embodiment of the invention shown in Figure 1.

Figure 5 is a detail elevation of a transmission box used in conjunction with the present invention, and Figure 6 is a perspective view thereof.

Figure 1:
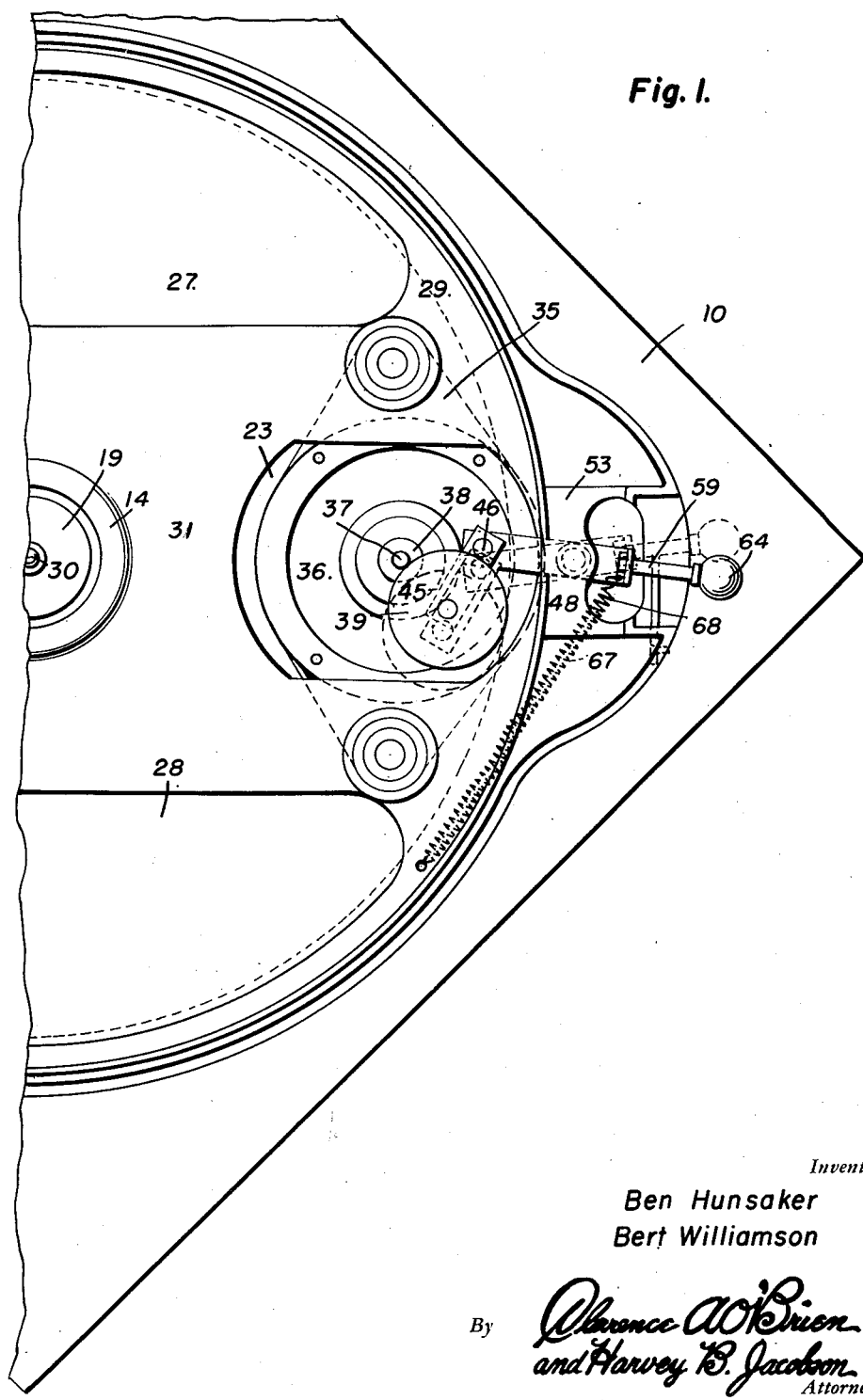
Figure 1 is a skeleton top plan view of a phonograph partly broken away and showing our invention.

Like reference characters indicate like parts throughout the following specification and in the several views in the drawings herewith illustrating the invention and in which 10 indicates a casting supporting our device. In the center of the wall 11 is a depending thimble 12 having an enlarged horizontal flange 13 seating in the recess 14, whereby it is supported. The thimble has a hard bottom 15 upon which is seated a ball 16, forming a seat for the lower end 17 of a spindle 18. Adjacent to the upper end of the spindle is an annular enlargement 19 forming a seat for a support or table 20 of a turntable 21, in which is an opening 22, which may be closed by a plate 23. The thimble 12 is provided with upper and lower spaced apart bushings 24 and 25, for holding the spindle truly vertical and without lost motion. The space 26 between the bushings forms an oil chamber. The upper end 30 of the spindle 18 projects through the members 20 and 21, to receive the record 29 (shown dotted in Figure 1 of the drawings).

Swung from the wall 11, is a bracket 35 through which a synchronous electric or other motor 36 is suspended; the shaft 37 of this motor has upon its upper end a pair of friction pulleys or rollers 38 and 38.' fixed thereon, either one of which are adapted to be engaged by the periphery 39 of a rubber friction pulley 41, periphery 39, of the pulley being the upper and larger of the two peripheries is engageable with the inner surface 42 of the depending annular flange 43 of said turntable 21.

Figure 2:
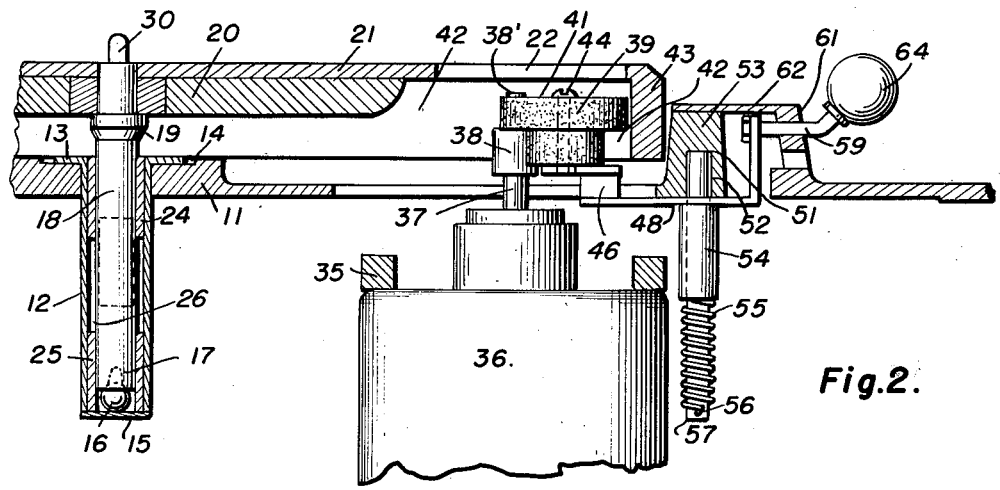
Figure 2 is a vertical sectional elevation view thereof.
Figure 3:
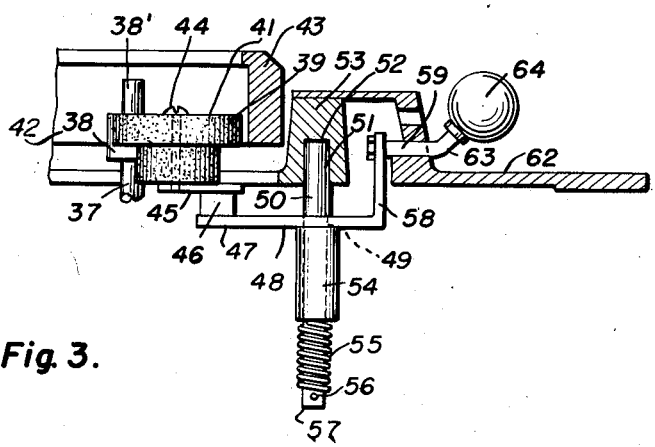
Figure 3 is an enlarged detail of a speed changing unit forming part of the invention.

The pulley 41 is rotatably mounted upon a screw bolt 44, which is secured at its lower end to a plate 45 extending inwardly from and connected to the pivot 46 mounted on the inner end 47 of a lever 48, which is provided intermediate of its ends with a bore 49, through which rod 50 extends and upon which the lever is pivoted. The upper end 51 of said rod is fixed in a bore 52 in the upright boss 53. Slidably mounted upon the rod 50, is a collar 54 seated upon a spring 55, which is coiled around the rod, the lower end of the spring seating upon a pin 56, which extends through the lower end 57 of said rod 50. This spring and collar 55 and 54 act to hold the lever 48 normally in a raised position, as illustrated in Figure 2 of the drawings, but permits depression of the lever as shown in Figure 3 of the drawings. The purpose of this arrangement is to provide for bringing the desired periphery of friction pulleys 38 and 38' into engagement with periphery 39 of the pulley 41.

The lever 48 is provided with a vertically disposed extension 58 and the inner end of a lever operating handle 59 is fixedly received on said extension. The horizontal shank thereof projects through a horizontally disposed adjustment slot 60 formed in the inclined wall 61 of a lid 62. The handle 59 has its outer end 63 upwardly inclined and terminates in a knob 64 for manipulating the lever 48. The slot 60 is substantially U-shaped and the confines or extensions 65 and 66 thereof are of different lengths for shifting and confining the shank 59 in positions for varying speed control of the turntable driving pulley. A coil spring 67 has its end 68 secured to the arm 58 and its end 69 secured to the inner surface of the wall 11, whereby the lever 48 is held in adjusted position. An adjustment screw 70 extends into the inner end 71 of slot 65 and a similar screw 72 extends into the inner end 73. The diameter of the pulley 38' as shown, is supposed to be such as to drive the turntable at a speed of 33⅓ R. P. M., when the shank 59 is disposed in the confines 65 of the slot 60; and to drive the turntable at a speed of 78 R. P. M. when said shank is shifted to the slot 66. The friction pulleys 38 and 38' of course being of diameters to drive said puck at the speeds stated.

In operation, as just above stated, when the shank 59 is disposed in the slot 65, the lever 48 has been shifted so as to bring the periphery 39 of the pulley into contact with the surface 42 of the turntable flange and at the same time brings the periphery 39 of the pulley 41 into contact with the friction pulley 38', giving a speed of 33⅓ R. P. M. to the turntable. However, when the said member 59 is shifted to the slot 66, the lever is lowered against the yielding opposition of the spring 55 and at the same time the periphery 39 is brought into engagement with the pulley 38, while periphery 39 still remains in engagement with the surface 42 of the flange 43, but at a lower point. This adjustment provides for a revolution of the turntable at a speed of 78 R. P. M. A detent 65' is provided between the arms 65 and 66 of the U-slot 60 in order that when the shifting arm is placed therein, no contact is made between the pulley 41 and the turntable, thus preventing flats being formed on the pulley 41. This is the neutral position.

It is obvious that the diameters of the pulleys 38 and 38' may be varied in order to provide for different speeds than those stated, if desired, and that the arrangement is suitable for both recording and transcription of records.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details and parts such as come within the purview of the invention claimed may be resorted to in actual practice, if desired.

Having now described our invention that which we claim is new and desire to procure by Letters Patent is:

1. In a phonograph a turntable unit and a driving mechanism independent of said unit, said mechanism including a motor and means for transmitting torque from the motor to the turntable, said motor including a shaft provided with a first and a second roller, a shaft, and a lever supporting said shaft, dissimilar diameter friction pulleys mounted on said shaft, at least one of which is adapted to selectively engage said first and said second roller, a pivot upon which the lever is mounted, a spring control normally holding said lever in a raised position, a plate having an aperture with locking lands therein, retaining the lever in selected positions, said turntable unit including a table, a spindle to which the table is fixed and a thimble in which the spindle is mounted, said thimble having a hard surface bottom and a ball therein upon which the spindle seats, and means whereby access may be had to said motor without removing said turntable.

2. In a phonograph including a chassis, a turntable unit and a driving mechanism for the unit independent of said unit, said driving mechanism including a motor having a shaft, a pair of unequal diameter rollers secured to said shaft, a rod mounted on the chassis, a lever mounted on said rod for vertical displacement, and a spring reacting on said rod and lever normally raising said lever, a pulley mounted on said lever which is selectively engageable with said rollers in driven relation, said pulley constantly drivingly engaging the disc of the turntable, and means attached to said chassis retaining said lever and consequently said pulley in selected positions.

3. The combination of claim 2 and said lever retaining means comprising a plate having slots therein with lands defined by the routes of the slots.

BERT WILLIAMSON.
BEN HUNSAKER.

REFERENCES CITED

The following references are of record in the file of this patent:

UNITED STATES PATENTS

| Number | Name | Date |
| --- | --- | --- |
| 2,157,158 | Blessing | May 9, 1939 |
| 2,254,066 | Gruber et al. | Aug. 26, 1941 |
| 2,260,289 | Brady et al. | Oct. 28, 1941 |
| 2,260,319 | Hoehn | Oct. 28, 1941 |
| 2,350,682 | Hoehn et al. | June 6, 1944 |